United States Patent
Mueller

(12) 
(10) Patent No.: US 6,293,361 B1
(45) Date of Patent: Sep. 25, 2001

(54) PROCESS AND SYSTEM FOR BRAKING A VEHICLE

(75) Inventor: Franz Mueller, Rosenheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/231,483

(22) Filed: Jan. 14, 1999

(30) Foreign Application Priority Data

Jan. 14, 1998 (DE) .............................................. 198 01 009

(51) Int. Cl.⁷ .................................................. B60K 28/06
(52) U.S. Cl. ........................... 180/272; 180/268; 701/45; 701/48
(58) Field of Search .................... 180/272, 271, 180/801.1, 268; 340/438; 701/36, 45, 48

(56) References Cited

U.S. PATENT DOCUMENTS

| | | |
|---|---|---|
| 4,492,952 * | 1/1985 | Miller . |
| 4,594,583 * | 6/1986 | Seko et al. ........................ 180/272 X |
| 5,172,785 | 12/1992 | Takahashi . |
| 5,521,580 | 5/1996 | Kaneko et al. . |
| 5,574,641 * | 11/1996 | Kawakami et al. .............. 180/272 X |
| 5,691,693 * | 11/1997 | Kithill ................................ 180/272 X |
| 5,835,008 * | 11/1998 | Colemere, Jr. . |
| 5,874,892 * | 2/1999 | Antonellis et al. .............. 180/272 X |
| 5,942,979 * | 8/1999 | Luppino ............................ 180/272 X |

FOREIGN PATENT DOCUMENTS

| | | |
|---|---|---|
| 38 35 726 A1 | 4/1990 | (DE) . |
| 3835726 | 4/1990 | (DE) . |
| 44 22 664 A1 | 3/1995 | (DE) . |
| 296 21 896 U1 | 7/1997 | (DE) . |
| 197 02 748 A1 | 9/1997 | (DE) . |
| 0 545 497 | 6/1993 | (EP) . |
| 0 706 466 B1 | 12/1996 | (EP) . |
| 26 725 | 9/1971 | (JP) . |
| 222 939 | 9/1988 | (JP) . |
| 160 127 | 7/1991 | (JP) . |
| 234 342 | 8/1994 | (JP) . |
| 39 755 | 2/1997 | (JP) . |
| 86/04869 | 8/1986 | (WO) . |

\* cited by examiner

*Primary Examiner*—J. J. Swann
*Assistant Examiner*—T. Zeender
(74) *Attorney, Agent, or Firm*—Crowell & Moring LLP

(57) ABSTRACT

A process for braking a vehicle senses changes of the bodily reactions pointing to an emergency or stress situation by way of sensors which sense bodily reactions and are preferably arranged on the driver's wrists or on the steering wheel rim. As a function of these sensors and their signals, an automatic braking operation is initiated.

5 Claims, 2 Drawing Sheets

PROCESS AND SYSTEM FOR BRAKING A VEHICLE

BACKGROUND OF THE INVENTION

This application claims the priority of German Patent Document, filed Jan. 14, 1998, the disclosure of which is expressly incorporated by reference herein.

The present invention relates to a process and system for braking a vehicle.

Processes and systems have been known for some time which sense changes of the bodily reaction of a human being, particularly of the driver of a motor vehicle, which point to emergency/stress situations. DE 38 35 726 A1 discloses, for example, a steering wheel contact sensor ring switch for controlling audio-visual warning systems, engine stop and emergency braking devices on motor vehicles. A warning signal is emitted and a braking operation is initiated when the driver's hands grip not only around the steering wheel.

DE 296 21 896 U1 discloses a switch-off device for a vehicle cruise control. The gas supply is interrupted and the cruise control is switched off when the driver's hands no longer have a grip around the vehicle steering wheel.

DE 197 02 748 A1 discloses a process for monitoring the condition of a human being, particularly of the driver of a motor vehicle. The head position and/or the cerebral flows and/or the muscular system and/or the breathing of the human being or the pressure at which the steering wheel is gripped are monitored or sensed continuously and/or at intervals. In the event of a threatening change of a bodily reaction, which points to an emergency/stress situation, a warning signal is emitted. Particularly the alertness of the driver of a motor vehicle is to be determined in this manner.

DE 44 22 664 A1 an EP 0 706 466 B1 describe a system and a process in which an automatic braking operation of a vehicle is triggered in the event of a reflex-type change of the position of the foot on the accelerator pedal from a first position to a second position. Such a reflex-type change of the position of the driver's right foot points to an emergency/stress situation.

Furthermore, so-called "brake assistant systems" are known. The operating speed of the brake pedal is sensed and, on the basis thereof a conclusion is drawn on an emergency/stress situation. If such a situation exists, an automatic emergency braking is initiated.

As the result of these processes and systems for initiating an automatic emergency braking, the braking distance of the vehicle is considerably reduced. However, these processes and systems have the disadvantage that, when an emergency situation arises, it always takes some time for the driver to react. This time comprises a reflex and reaction time period. That is, the time period is the time which passes until the driver understands the situation and reacts in that the driver's right foot is removed from the accelerator pedal and moved in the brake pedal direction in order to operate the brake pedal.

SUMMARY OF THE INVENTION

An object of the present invention is, therefore, to provide a process such that the time which passes from an emergency situation arising to the initiation of the automatic braking operation is shortened. Sensors are provided for detecting the driver's bodily reaction pointing to an emergency/stress situation, and the output signals of these sensors are supplied to the sensing and operating device.

The invention is also based on the object of providing a system for braking a vehicle such that the vehicle comes to a stop not only in emergency/stress situations of the driver within a very short time but that, in particular, unintentional emergency braking operations are also largely avoided.

In a system of the above-mentioned type for braking a vehicle, this object has been achieved according to the present invention in that additional sensors are provided which, in addition, detect an operation of the vehicle which Points to a braking operation, preferably a change of position of the accelerator and/or brake pedal and/or a change of position of a driver's foot operating the accelerator pedal and the brake pedal. The output signals of these sensors are fed to the sensing and operating device.

Because sensors are provided for sensing the driver's bodily reaction which points to an emergency/stress situation and simultaneously sensors are provided which sense the accelerator pedal and/or brake pedal position and/or a change of position of a driver's foot operating the accelerator pedal and/or the brake pedal whose output signals are fed to a sensing and operating device, the danger of an unintentional triggering and maintenance of an emergency braking situation can be largely avoided.

As far as the sensing of bodily reactions pointing to an emergency/stress situation is concerned, a great variety of sensors and sensing possibilities are conceivable purely in principle. Preferably, a change is sensed in the blood pressure, the pulse, the pupil, facial expression, eyelid reflex, the muscle contraction, preferably the hand muscles, skin resistance and/or sweat secretion. In emergency/stress situations, all these bodily reactions will exhibit significant changes.

It is also understood that the arrangement, sensitivity and the like of the sensors must be adapted to the driver of the vehicle, which advantageously occurs automatically by routines which are known per se and take place before starting of the vehicle.

The present invention also relates to a system for braking a vehicle which comprises a sensing and operating device so that a change of the operation of the vehicle by a driver can be sensed. Therefore an automatic braking operation can be initiated so that the danger of unintentionally triggered automatic braking operations is minimized.

In a process for braking a vehicle, this object has been achieved according to the invention in that the automatically initiated braking operation is maintained only if additionally a change of the operation of the vehicle pointing to a braking operation, preferably a change of position of the accelerator pedal and/or the brake pedal, and/or a change of position of the driver's foot operating the accelerator pedal and the brake pedal is sensed by a sensing and operating device and as long as this change or these changes are sensed.

The process of the present invention avoids an unintentional triggering of an automatic braking operation in a very advantageous manner. Furthermore, termination of the automatic braking operation is ensured when the braking operation is terminated by the driver.

For sensing the driver's bodily reactions pointing to an emergency/stress situation, the sensors may purely in principle be configured and arranged in a variety of fashions. For example, an advantageous embodiment provides that at least one sensor is arranged on the vehicle driver's wrist for sensing a bodily reaction caused by an emergency/stress situation. In another currently contemplates advantageous embodiment, one or several sensors is/are arranged on the steering wheel rim of the vehicle. In still another advantageous embodiment, the sensors are arranged in the vehicle and are aligned with the driver.

The at least one sensor arranged on the wrist, preferably a change of the skin resistance, a change of the sweat secretion, a change of the blood pressure, a change of the pulse and/or a change of the muscle contraction is/are sensed.

The sensors arranged on the steering wheel rim preferably sense the muscle contraction of the hand muscles, a change of the skin resistance and/or a change of the sweat secretion. The sensors arranged in the vehicle and aligned with the driver preferably sense a change of the pupil, a change of the eyelid reflex and/or a change of the facial expression.

The signal transmission from the sensors to the sensing and operating device can take place in a variety of ways. In an advantageous embodiment, for example, a signal transmission takes place from the sensors to the sensing and operating device via a no-contact signal transmission, preferably radio signals.

In order to permit a very fast operation of the vehicle brake independently of the position of the driver's right foot, switching elements can be provided for manually operating the vehicle brake.

Advantageously, the arrangement and the sensitivity of the sensors can be individually adapted to the driver of the vehicle. An optimal operation of the sensors is ensured in this manner. Furthermore, an advantageous embodiment provides that the sensors also detect bodily reactions which point to a dangerous physical condition, particularly a circulatory collapse or a cardiac infarction.

Furthermore, in addition to automatically triggering a braking operation, the sensing and operating device can also initiate an automatic operation of the belt tightening devices and maintain that operation until the braking operation is terminated by the driver or the vehicle collides with an obstacle. This is a considerable advantage particularly in an "out-of-position" sitting arrangement of the vehicle occupants since this ensures that the occupants are in an optimal sitting position particularly when the air bag is triggered.

Other objects, advantages and novel features of the present invention will become apparent from the following detailed description of the invention when considered in conjunction with the accompanying drawings.

DETAILED DESCRIPTION OF THE DRAWINGS

A system for braking a vehicle comprises a sensing and operating device 10 by which a change of the operation of the vehicle by a driver can be sensed and a braking operation can be initiated.

The sensing of the operation of the vehicle by a driver takes place by sensors 30 which sense, for example, a change of the accelerator pedal position or brake pedal position and/or a fast change of the driver's right foot. The output signals of the sensors 30 are fed to and processed in the sensing and operating device 10, and, for example, in the event of a fast taking-back of the accelerator pedal and/or a fast operation of the brake pedal (i.e., in the event of a fast reflex-type change of the position of the right foot), an automatic braking operation is initiated in a manner which is known per se and is described, for example, in DE 44 22 664 A1 or in EP 0 706 466 B1, which are incorporated by reference herein.

It is understood that the sensors 30 can also detect the termination of the braking operation which takes place, for example, by stepping on the accelerator pedal or by a taking-back of the brake pedal.

Figure 2:
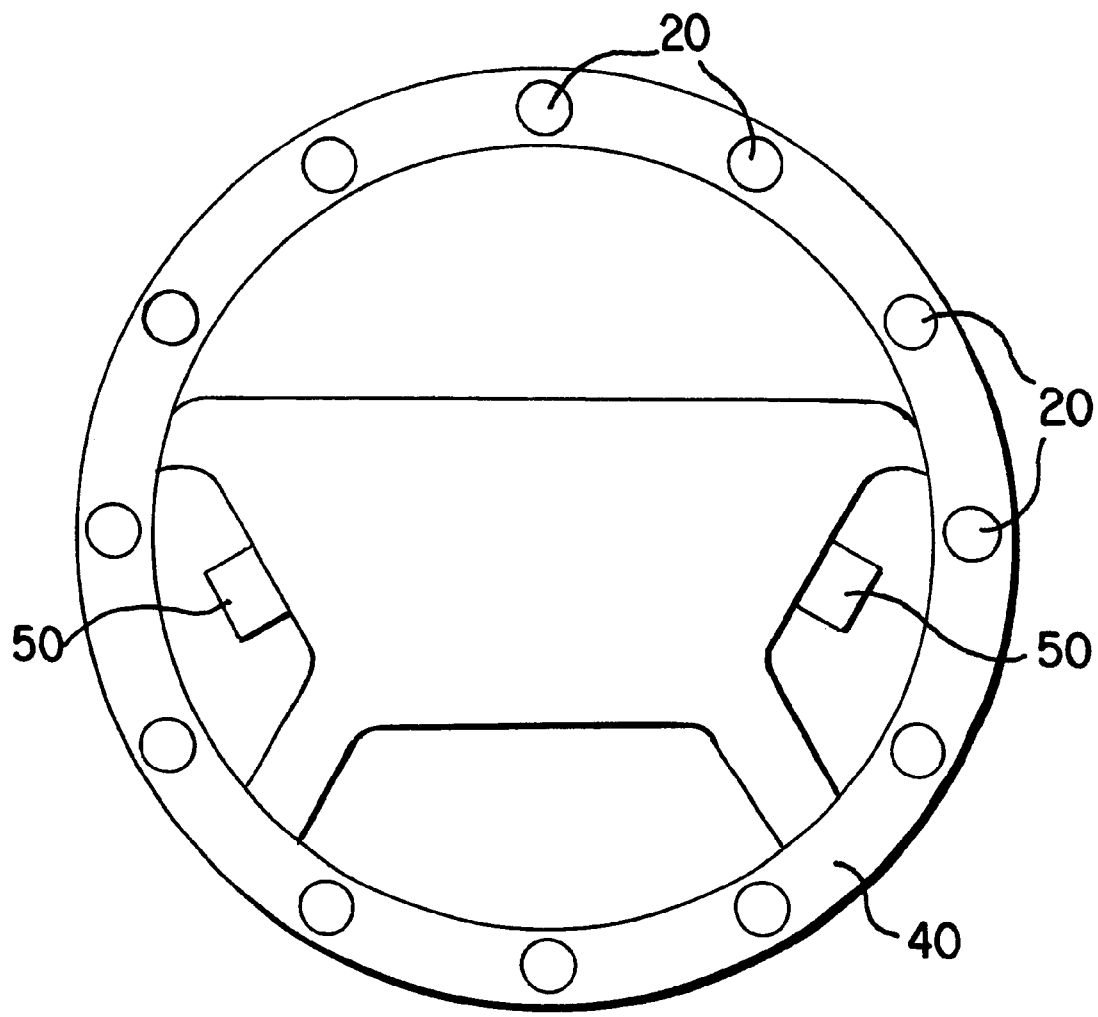
FIG. 2 is a schematic plan view of an arrangement of sensors on the steering wheel rim of a vehicle for detecting changes of the bodily functions pointing to emergency/stress situations in accordance with the present invention.

In addition to the sensors 30, other sensors 20 can be provided to sense the driver's bodily reaction pointing to an emergency/stress situation. The output signal of these sensors 20 is also fed to the sensing and operating device 10 and is processed therein. As illustrated schematically in FIG. 2, the sensors 20 may, for example, be pressure sensors which are arranged on the steering wheel rim 40 of a vehicle steering wheel and which sense the intensity of a grip around the steering wheel by the driver's hand, that is, the muscle contraction of the hand. In addition, sensors may be provided which sense a change of the skin resistance and/or a change of the blood pressure and/or a change of the pulse and/or a change of the sweat secretion or even a change of the pupil or a change of the facial expression or of the eyelid reflex.

Figure 1:
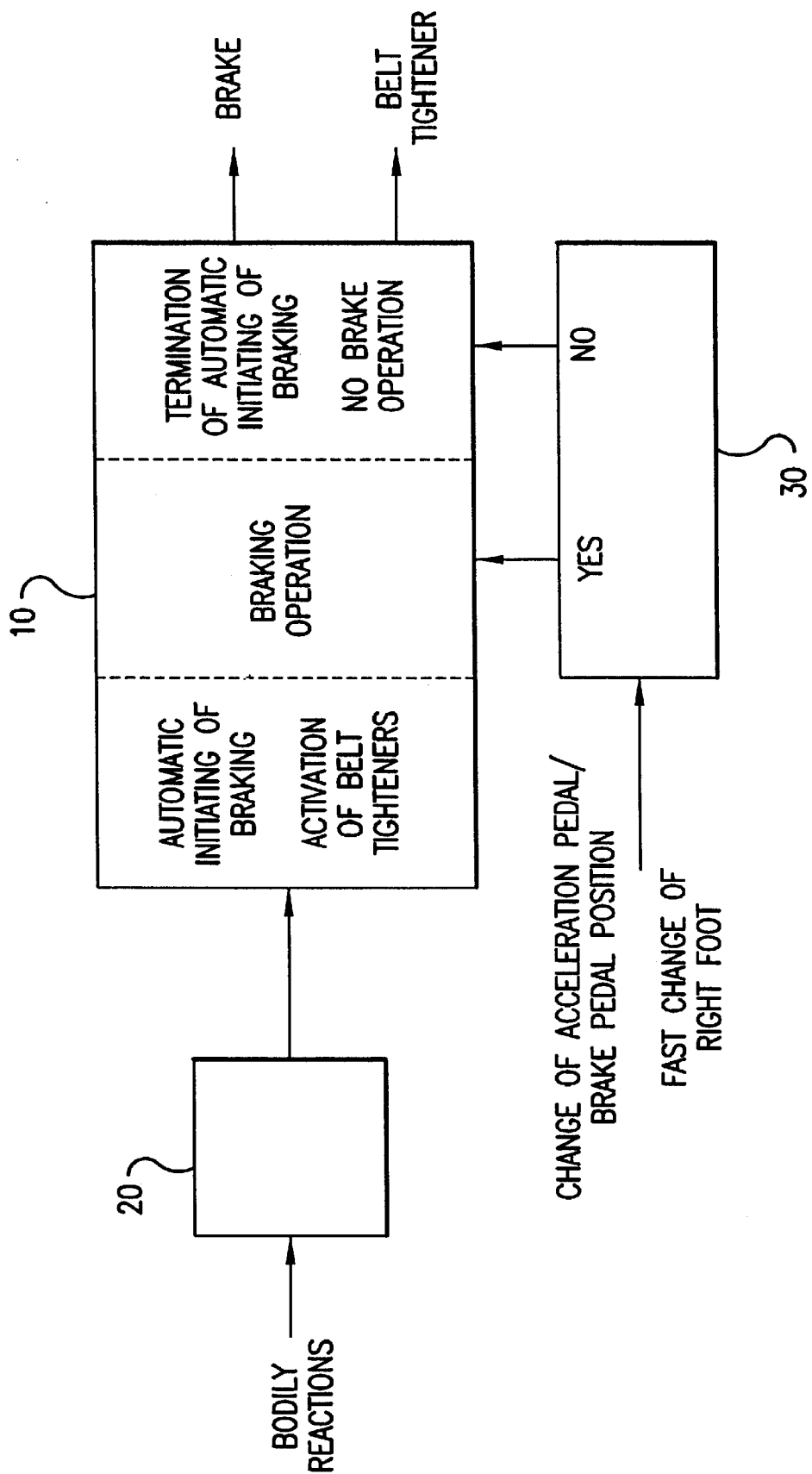
FIG. 1 is a schematic block diagram for explaining an embodiment of a process for braking a vehicle according to the present invention.

When the sensors 20 sense a driver's bodily reaction, such as a rise of the blood pressure, a change of the skin resistance, an intense grip around the steering wheel or the like, which points to an emergency/stress situation, the sensing and operating device 10 initiates an automatic braking operation. This braking operation is maintained only if signals are additionally transmitted to the sensing and operating device 10 by the sensors 30, which detect a fast change of the driver's right foot, that is, a change of the accelerator pedal/brake pedal position. In this manner, it is ensured that, in the emergency/stress situation, the driver intends to brake the vehicle. As indicated in FIG. 1, in addition to the automatic triggering of a braking operation, an automatic operation of the belt tightening devices should also take place. The automatic operation of the belt tightening devices will be maintained until either the driver terminates the braking operation, which is determined by the sensors 30, or until the vehicle collides with an obstacle. At that point in time, an extension of the belt strap will take place.

As the result of the operation of the belt tightening device initiated together with the automatic braking operation, the vehicle occupants are assured to be held in the belt system in a particularly advantageous firmly secured manner. This early operation of the belt tightening devices is very important not only when the air bags are triggered because of an impact but particularly also when the air bags are triggered at a low impact speed, during a faulty triggering of the air bags or in the case of an "out-of-position" sitting arrangement of the vehicle occupants since a danger of injury can be avoided in this manner.

In addition to the above-described arrangement of the sensors 20 in the steering wheel rim 40, an arrangement of one or several sensors is conceivable also on the wrist or at a different point of the vehicle driver's body or in the vehicle itself. Purely in principle, any type of sensors can be used which accurately sense or detect the driver's bodily reactions pointing to an emergency/stress situation.

In order to be able to also manually trigger a very fast braking operation in emergency situations, in addition to an automatic brake triggering, a manual brake triggering is also provided by switching elements 50 in the form, for example, of push buttons or the like, arranged, for example, on the steering wheel. In this embodiment, a braking operation in emergency/stress situations can be initiated manually similar to the operation of an emergency shutdown key on machines.

The above-described process and the above-described system are not limited to motor vehicles. Such a process and such a system could also be used in other vehicles, for example, airplanes during the starting phase, or, on rail vehicles or watercraft.

Furthermore, it may also be provided that the sensing and operating device operates signal devices (not shown) which warn of an approaching or driving up vehicle. This may initiate an early braking of vehicles which follow, particularly when there is a falling below the distance with respect to the approach speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for braking a vehicle, the process comprising the acts of;

sensing bodily reactions which are indicative of change in an emergency or stressful situation;

sensing a first operating change of the vehicle pointing to a braking operation, initiating an automatic braking operation in response to the sensing acts, and maintaining the automatically initiated braking operation only when a further operating change of the vehicle pointing to a braking operation is sensed.

2. Process according to claim 1, wherein the first operating change comprises at least one of an accelerator pedal position change, a brake pedal position change, and a driver's foot position change.

3. Process according to claim 1, wherein the further operating change comprises at least one of an accelerator pedal position change, a brake pedal position change, and a driver's foot position change.

4. Process according to claim 1, wherein the step of sensing bodily reactions occurs by way of sensors arranged on a driver's wrists or on a steering wheel rim.

5. Process according to claim 1, wherein the step of sensing the bodily reactions comprises detecting at least one of a blood pressure change, a pulse change, a pupil change, facial expression change, an eyelid reflex change, a muscle contraction, a skin resistance change, and a sweat secretion change.

* * * * *